(12) United States Patent
Dunn et al.

(10) Patent No.: US 8,569,910 B2
(45) Date of Patent: Oct. 29, 2013

(54) SYSTEM AND METHOD FOR CONTROLLING THE OPERATION PARAMETERS RESPONSE TO CURRENT DRAW

(75) Inventors: William Dunn, Alpharetta, GA (US); John Schuch, Buford, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 488 days.

(21) Appl. No.: 12/711,600

(22) Filed: Feb. 24, 2010

(65) Prior Publication Data

US 2010/0237697 A1 Sep. 23, 2010

Related U.S. Application Data

(60) Provisional application No. 61/154,936, filed on Feb. 24, 2009.

(51) Int. Cl.
*H02J 3/10* (2006.01)
*H02J 1/00* (2006.01)
*H02J 3/14* (2006.01)

(52) U.S. Cl.
USPC .......................................................... 307/31

(58) Field of Classification Search
USPC ........................ 307/31, 34, 39; 345/101, 102
See application file for complete search history.

(56) References Cited

U.S. PATENT DOCUMENTS

| 4,093,355 | A | 6/1978 | Kaplit et al. |
|---|---|---|---|
| 4,593,978 | A | 6/1986 | Mourey et al. |
| 4,634,225 | A | 1/1987 | Haim et al. |
| 5,029,982 | A | 7/1991 | Nash |
| 5,088,806 | A | 2/1992 | McCartney et al. |
| 5,247,374 | A | 9/1993 | Terada |
| 5,559,614 | A | 9/1996 | Urbish et al. |
| 5,748,269 | A | 5/1998 | Harris et al. |
| 5,767,489 | A | 6/1998 | Ferrier |
| 5,818,010 | A | 10/1998 | McCann |
| 6,089,751 | A | 7/2000 | Conover et al. |
| 6,157,432 | A | 12/2000 | Helbing |
| 6,191,839 | B1 | 2/2001 | Briley et al. |

(Continued)

FOREIGN PATENT DOCUMENTS

| JP | 03153212 | 7/1991 |
|---|---|---|
| JP | 11160727 | 6/1999 |

(Continued)

OTHER PUBLICATIONS

Zeef, Hubing, EMC analysis of 18' LCD Monitor, Aug. 2000, 1 page.

*Primary Examiner* — Carlos Amaya
(74) *Attorney, Agent, or Firm* — Standley Law Group LLP (57) ABSTRACT

A system and method for controlling the power consumption of an electronic display. A maximum current value may be selected where above this value the risk to damage to the display or local circuitry may be jeopardized. Ramp-wise and/or gradual controls of the display parameters such as fan speed and backlight levels may reduce the current draw during extreme situations and line voltage fluctuations. Embodiments allow the display to continue operation without risking an overload of the local circuit or damage to the display. Further embodiments may be used to limit the power consumption of a display in order to minimize energy usage. Several parameters can be measured and controlled simultaneously to provide a minimal amount of energy usage while minimizing any noticeable difference in images.

17 Claims, 8 Drawing Sheets

(56) References Cited

U.S. PATENT DOCUMENTS

| | | |
|---|---|---|
| 6,417,900 B1 | 7/2002 | Shin et al. |
| 6,535,266 B1 | 3/2003 | Nemeth et al. |
| 6,628,355 B1 | 9/2003 | Takahara |
| 6,839,104 B2 | 1/2005 | Taniguchi et al. |
| 6,885,412 B2 | 4/2005 | Ohnishi et al. |
| 6,943,768 B2 | 9/2005 | Cavanaugh et al. |
| 7,330,002 B2 | 2/2008 | Joung, II |
| 7,474,294 B2 | 1/2009 | Leo et al. |
| 7,795,821 B2 | 9/2010 | Jun |
| 2002/0101553 A1 | 8/2002 | Enomoto et al. |
| 2002/0126248 A1 | 9/2002 | Yoshida |
| 2002/0167637 A1* | 11/2002 | Burke et al. .......... 349/161 |
| 2003/0007109 A1 | 1/2003 | Park |
| 2003/0020884 A1 | 1/2003 | Okada et al. |
| 2003/0230991 A1 | 12/2003 | Muthu et al. |
| 2004/0036834 A1 | 2/2004 | Ohnishi et al. |
| 2004/0165139 A1 | 8/2004 | Anderson et al. |
| 2005/0231457 A1 | 10/2005 | Yamamoto |
| 2005/0242741 A1 | 11/2005 | Shiota et al. |
| 2006/0022616 A1 | 2/2006 | Furukawa et al. |
| 2006/0125773 A1 | 6/2006 | Ichikawa et al. |
| 2007/0297163 A1 | 12/2007 | Kim et al. |
| 2008/0055297 A1 | 3/2008 | Park |
| 2009/0033612 A1 | 2/2009 | Roberts et al. |
| 2009/0104989 A1 | 4/2009 | Williams et al. |

FOREIGN PATENT DOCUMENTS

| | | |
|---|---|---|
| JP | 2000-122575 A | 4/2000 |
| JP | 2006145890 | 6/2006 |
| JP | 200803481 | 2/2008 |
| JP | 2009031622 | 2/2009 |
| KR | 1020080000144 | 1/2008 |
| KR | 1020080013592 | 2/2008 |
| KR | 1020080086245 | 9/2008 |
| WO | 2008-050402 A1 | 5/2008 |

\* cited by examiner

SYSTEM AND METHOD FOR CONTROLLING THE OPERATION PARAMETERS RESPONSE TO CURRENT DRAW

CROSS-REFERENCE TO RELATED APPLICATIONS

This application is a non-provisional patent application claims priority to U.S. application No. 61/154,936 filed on Feb. 24, 2009 and is herein incorporated by reference in its entirety.

TECHNICAL FIELD

The exemplary embodiments herein generally relate to electronic displays and systems which perform ramp-wise and/or gradual control of various parameters to maintain a desired range of current draw and/or minimize energy consumption.

BACKGROUND OF THE ART

Traditionally, advanced electronic display systems have only been used for indoor applications or outdoor applications where the variation in temperature and/or amount of direct sunlight is limited. When these systems are moved outside, both temperature and sunlight become significant factors in the display's ability to produce an image and maintain an adequate operating temperature for the various components within the display.

Cold temperatures may be especially harmful to liquid crystal display (LCD) systems where the crystals can respond less quickly and in extreme cases can actually freeze. Heat is also harmful to many electronic displays as the electrical components which drive the display system may overheat and malfunction. In order to prevent damage to the display components in high or low temperatures, a number of heating and cooling systems have been proposed. Although some of these systems are able to adequately control the temperature of the display, many times these systems require large amounts of power.

Several issues become concerning when displays begin to draw large amounts of power. Obviously, energy concerns are always an issue, and consumers desire to keep energy consumption and corresponding energy costs at a minimum. Further, large power consumption can correspond to a spike in current draw and the risk of overloading a local circuit, most notably in the form of tripping a breaker or fuse. Often times the line voltages which are supplying these displays may fluctuate, either mild or large ('brown outs'). A lowering of the line voltage typically results in an increased current draw by the display and subsequently an overload on the local circuit. Thus, there exists a need to develop a system which can maintain the best possible display performance while controlling the power consumption and preventing the overloading of a local circuit.

SUMMARY OF THE EXEMPLARY EMBODIMENTS

Exemplary embodiments include a system and method for adjusting the backlight and/or cooling/heating systems on an electronic display based on current draw, temperature, and optional luminance measurements.

The electronic display backlight is a significant source of heat and energy consumption for a typical display. As mentioned above, too much heat or too little heat can also damage or destroy the components of an electronic display. Thus, exemplary embodiments control the level of the display backlighting based on the temperature of the air within the backlight cavity and the display's current draw.

Further, some embodiments also monitor the internal temperature of the display and control the heating/cooling assemblies of a display in response to these internal temperatures and current draw. When current draw/power consumption becomes an issue, some embodiments run the heating/cooling assemblies only as much as necessary or selectively engage only systems which heat or cool areas of the display which require immediate thermal control.

The amount of light that is required from a display backlight is dependant upon the amount of ambient light that is coming from the surrounding environment. For example, when the surrounding environment is very bright, a large amount of light is required from the backlight, as this light must overcome the bright light which is in the environment and is reflecting off the display surface. In contrast, when the surrounding environment is very dark, a smaller amount of light is required from the backlight, as the display's light does not have to compete with a bright ambient light. Thus, when energy consumption or current draw becomes a concern, some embodiments use only as much backlight illumination as necessary to create an acceptable image based on the level of ambient light.

Some sources of backlighting degrade over time. For example, LED's may degrade over time and emit less light. Exemplary embodiments also allow for the brightness of a display to adjust based on the degradation of the light source.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
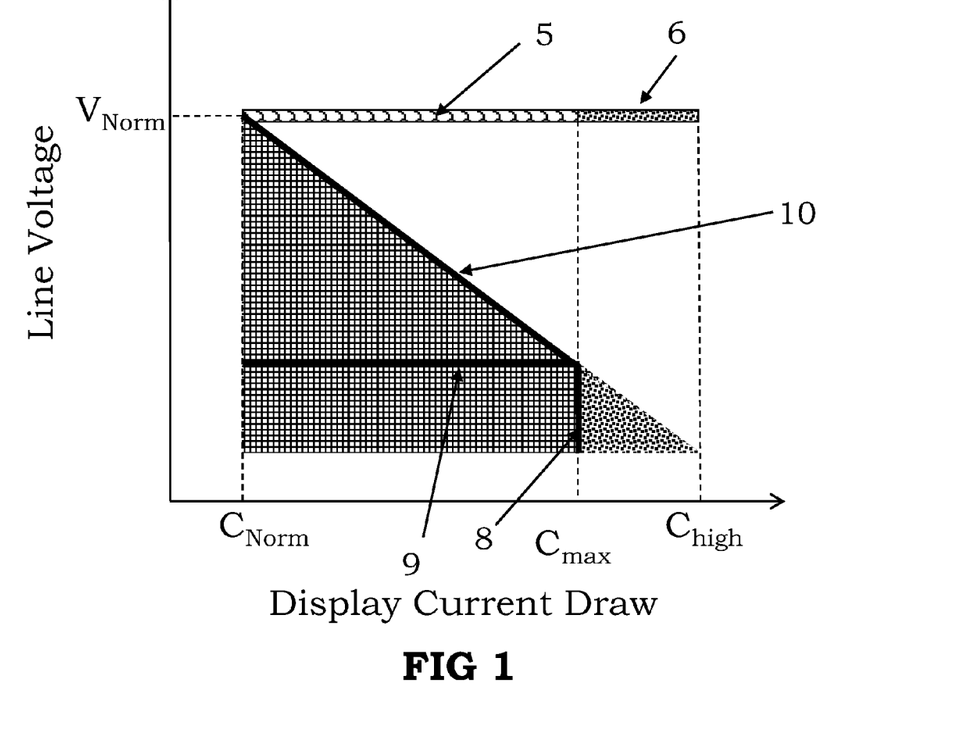
FIG. 1 is a graphical representation of typical line voltage versus a typical electronic display current draw.

FIG. 1 provides a rough graphical representation of the relationship between line voltage (shown on the y axis) and the current draw of an electronic display (shown on the x axis). $V_{Norm}$ represents the nominal line voltage for the particular installation. The nominal line voltage varies depending on the location that the display is installed. The area 5 on the figure represents what would be considered a normal operating condition where the line voltage remains relatively constant but there may be an increase of current draw based on high demand of the backlight or cooling/heating system for the display. $C_{MAX}$ represents the desired upper limit of current draw for the display. Once the current draw becomes greater than $C_{MAX}$, the risk of overloading the local circuit becomes higher. Area 6 represents an area where the current draw of the display is of very high concern, and the system herein should be employed to reduce the current draw of the system to avoid overloading the circuit (or perhaps excessive energy usage).

Line voltages are not always constant. A 'blackout' is widely known and results when the line voltage ceases altogether. However, a 'brownout' is also a known phenomenon and results when the line voltage does not cease, but simply decreases. Sometimes this decrease is small, but other times it can be quite large. Line 10 gives a rough representation of what may happen to a display's current draw when the voltage decreases. Thus, as the line voltage decreases, the display's current draw may increase in a roughly linear fashion as the display attempts to maintain operation under less supply voltage. Some increases in display current draw can be accommodated by existing systems and local circuits, but when the display reaches line 8 there becomes a high risk of overloading the circuit. Thus, embodiments herein would also be able to take a display which has reached line 8 and may (for the given line voltage) reduce the current draw of the display and travel back approximately along line 9 (if the line voltage were to remain at this lower level).

It should be noted that although there are shaded portions and lines on the figure, the relationship between the line voltage and display current draw is complex and the data will not always travel along the lines shown or remain within the shaded areas. There may be large dynamic spikes followed by periods of relative constant current draw. The figure is only meant to show the basic relationship of some of the phenomenon that may be addressed by the embodiments herein.

Devices of the past have traditionally lacked the capability for carefully controlling the current draw of the system, especially under dynamic conditions such as a brownout. Typically, these devices would either continue until the circuit was overloaded or drastically cut the backlight level or turn the backlight off entirely. The embodiments herein utilize a gradual ramp-wise control of the various components so that drastic changes can be avoided. Thus, the backlight is only reduced when absolutely necessary, as the backlight is necessary for producing any image upon the display. For informational or advertising displays, it is important that the image remains in the best possible view until it is absolutely necessary that it be reduced or eliminated. A similar ramp-wise and gradual control theory is applied for general energy conservation principles. In these scenarios, the backlight is only illuminated to the extent that it remains adequately visible depending on temperature and ambient light levels. Further, when power consumption becomes a concern, the cooling/heating devices are first selectively reduced before the backlight assembly.

Figure 2:
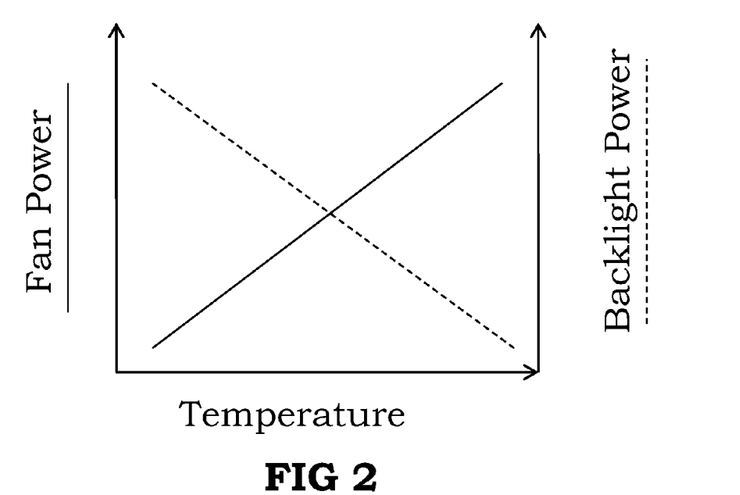
FIG. 2 is a graphical representation of ideal backlight power and fan power versus the temperature inside the display housing.

FIG. 2 provides a rough graphical display of the relationship between the internal display temperature (x axis), the power sent to one or more fans (left y axis), and the power sent to the backlight (right y axis). When current draw becomes an issue and the temperature of the display is relatively low, the power to the backlight can remain high (or can even increase) while the power to the fan is reduced (since it is not necessary due to the low display temperature). Conversely, when current draw becomes an issue and the temperature of the display is relatively high, the power to the backlight may be reduced while the power to the fan may remain constant (or can even increase). The balance of these two factors can help gracefully manage the display's current draw while also protecting the display from damage.

It should be noted that the relationship between temperature, fan power, and backlight power does not have to take the form of the graph shown in FIG. 2. For example, the backlight power does not have to increase as the fan speed decreases. In an exemplary embodiment, the backlight may stay at its maximum output while the power to the fans is simply decreased to avoid the increase in current. Also, as discussed thoroughly in this application, the backlight does not have to decrease as the temperature rises, but this may be used as a tool to lower the temperature of the display when current draw becomes a concern. The figure only provides a rough approximation of the relationship between the various display parameters.

Figure 3:
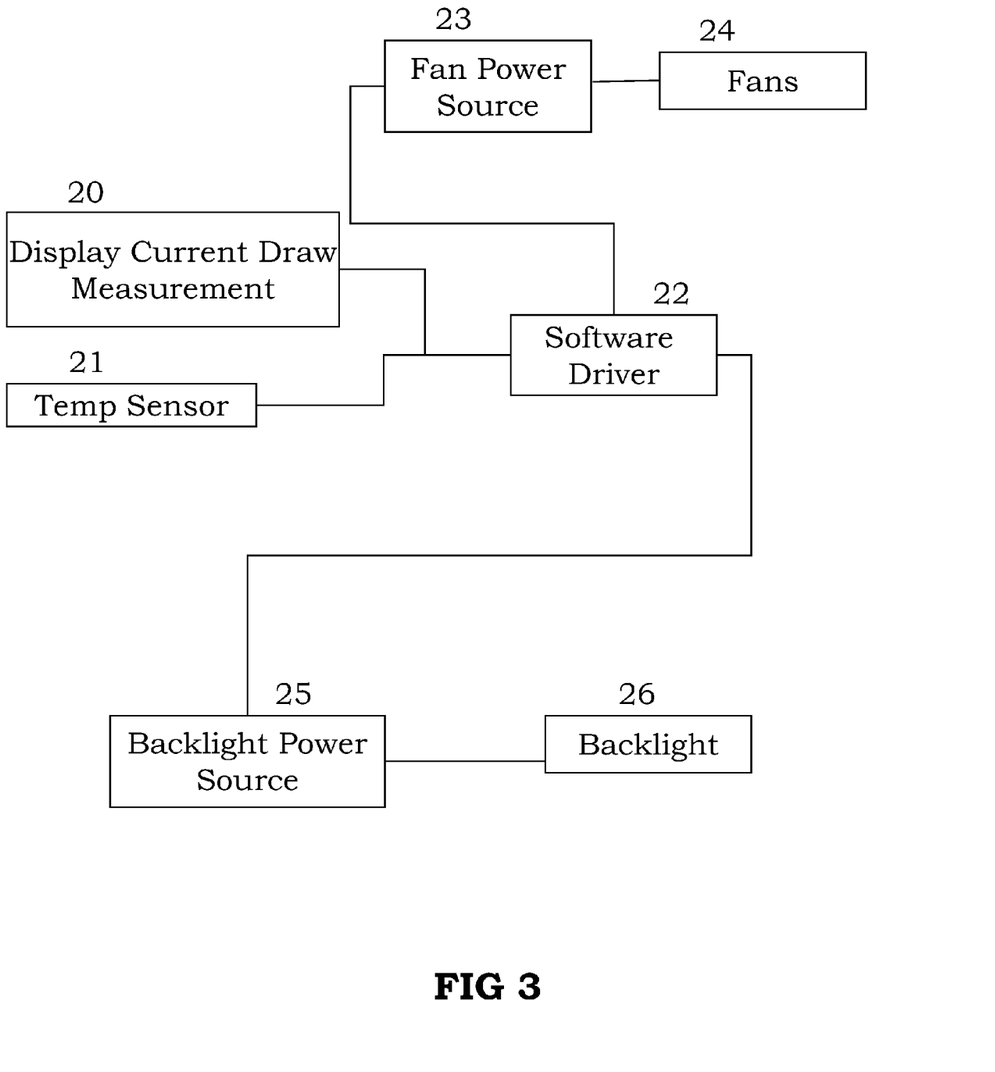
FIG. 3 is a schematic of the basic components for controlling the backlight and cooling fans in response to temperature measurement and current draw.

FIG. 3 shows the basic components for a general embodiment. A current draw measuring device 20 is in electrical communication with a software driver 22. A temperature sensor 21 is also in electrical communication with the software driver 22. The software driver 22 is then in electrical communication with the fan power source 23 which drives the fans 24. The software driver 22 is also in electrical communication with the backlight power source 25 which drives the backlight 26. Additional backlight luminance sensors may also be present to provide a feedback loop for the backlight system. Ambient light sensors (see FIG. 8) may also be used.

The current draw measurement device 20 can take many forms. Some embodiments may measure the overall draw of current from the entire display based on a sensing device located at the overall power connection for the display. Other embodiments may use a feedback loop coming from each of the power modules used to run each of the display components. Thus, although only two power sources are shown in FIG. 3, there may be multiple power sources used to power the backlight alone or the fans alone and there may be additional power sources for powering the software driver and the display assembly itself (ie. LCD stack, OLED, or plasma assembly). Other embodiments may use feedback loops for the fan power source 23 and the backlight power source 25 in order to verify the controls which are being sent from the software driver 22. These feedback loops are commonly known and will not be discussed further herein.

The software driver 22 may be any commercially available control system or microcontroller. Preferably, the software driver 22 comprises an $e^2$prom (or eeprom), which is commercially available from Digi-Key of Thief River Falls, Minn. (www.digi-key.com).

The temperature sensor 21 may be placed in a number of locations within the display. Ideally, if only a single temperature sensor is being used it should preferably be placed in an area of the display which is known to overheat and may be directly or indirectly cooled by the fans 24.

Figure 4:
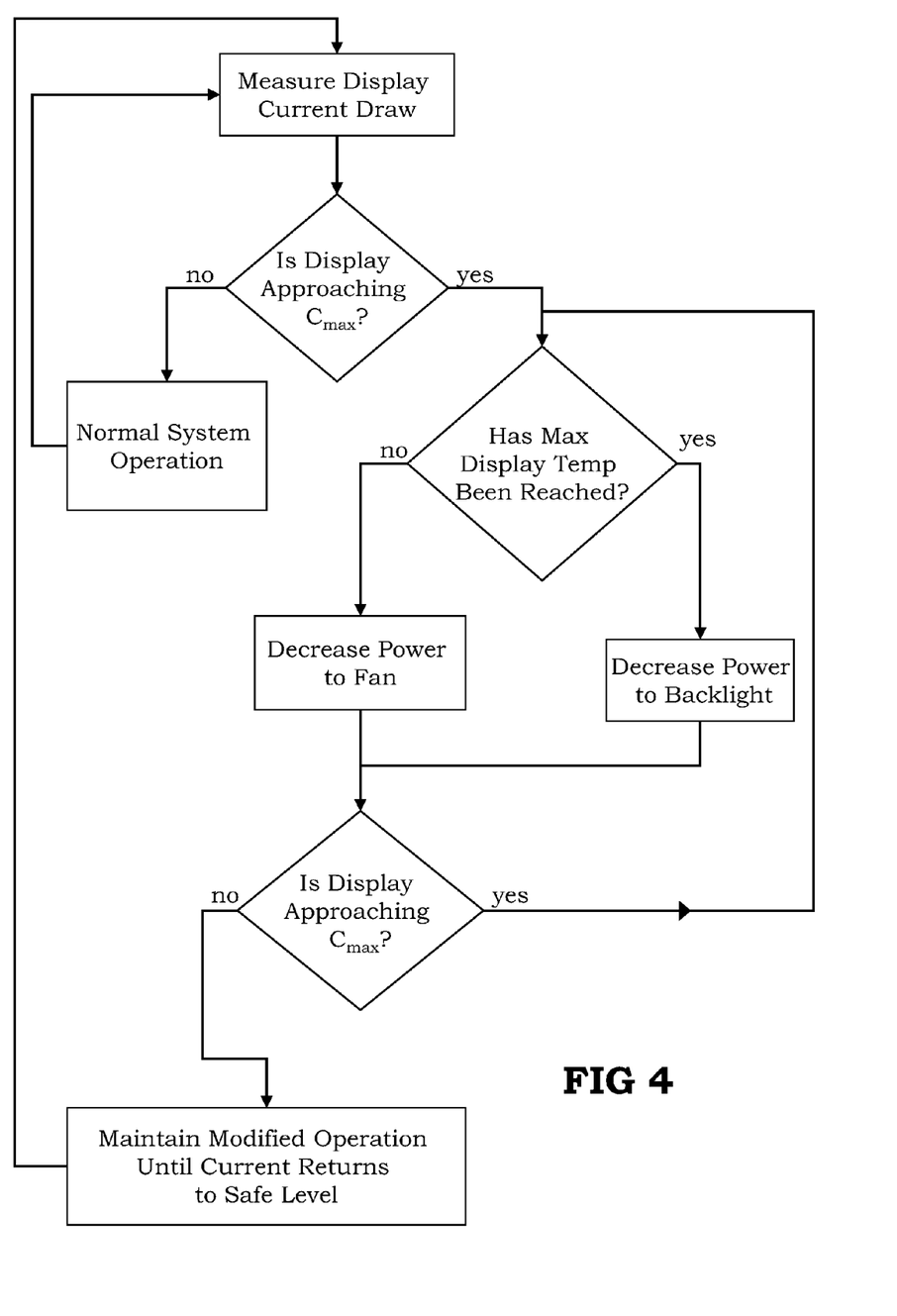
FIG. 4 is a flow chart showing the logic for controlling the backlight and cooling fans in response to temperature and current draw.

FIG. 4 provides one example of the logic which may be performed by the software driver 22 of the embodiment shown in FIG. 3. The logic would preferably begin by measuring the current draw of the display and comparing it to the $C_{max}$ value, which may be pre-determined based on the local circuit which the display is being installed within or may be set for energy-saving purposes. If the display's current draw is not approaching $C_{max}$ then the display can continue with normal operation. Normal system operation would allow the display to run the backlight and cooling/heating systems to the highest level that are deemed necessary to maintain adequate performance. Cooling/heating systems can be run as needed (probably still based off a temperature sensor, but not necessarily as they could simply run non-stop) and the backlight may or may not adjust for ambient light levels as current draw is not a concern.

However, if the display is approaching $C_{max}$ then the temperature of the display will be checked. A maximum temperature for the display may be predetermined based on testing of the display, and may represent the highest temperature where the display can operate without significant damage to its components. If the display has not reached its maximum allowable temperature, then to reduce the current draw the system may slightly reduce the power sent to the cooling fans. Once this power has been reduced, the system may re-check the display's current draw and if the display is still approaching $C_{max}$ then the logic may return to re-measure the display temperature and, if the maximum display temperature has not been reached, may further reduce the power to the fans.

If the system determines that the maximum display temperature has been reached (either after the first measurement or after reducing the power to the fans) then the power to the backlight may be slightly decreased. The maximum backlight possible is usually desired, so the power to the backlight would preferably be gradually and slightly reduced in a ramp-wise and gradual fashion until the display is no longer near $C_{max}$. These levels are then maintained until the current lowers (and possibly the temperature) and the system returns to the beginning of the logic pattern.

Figure 5:
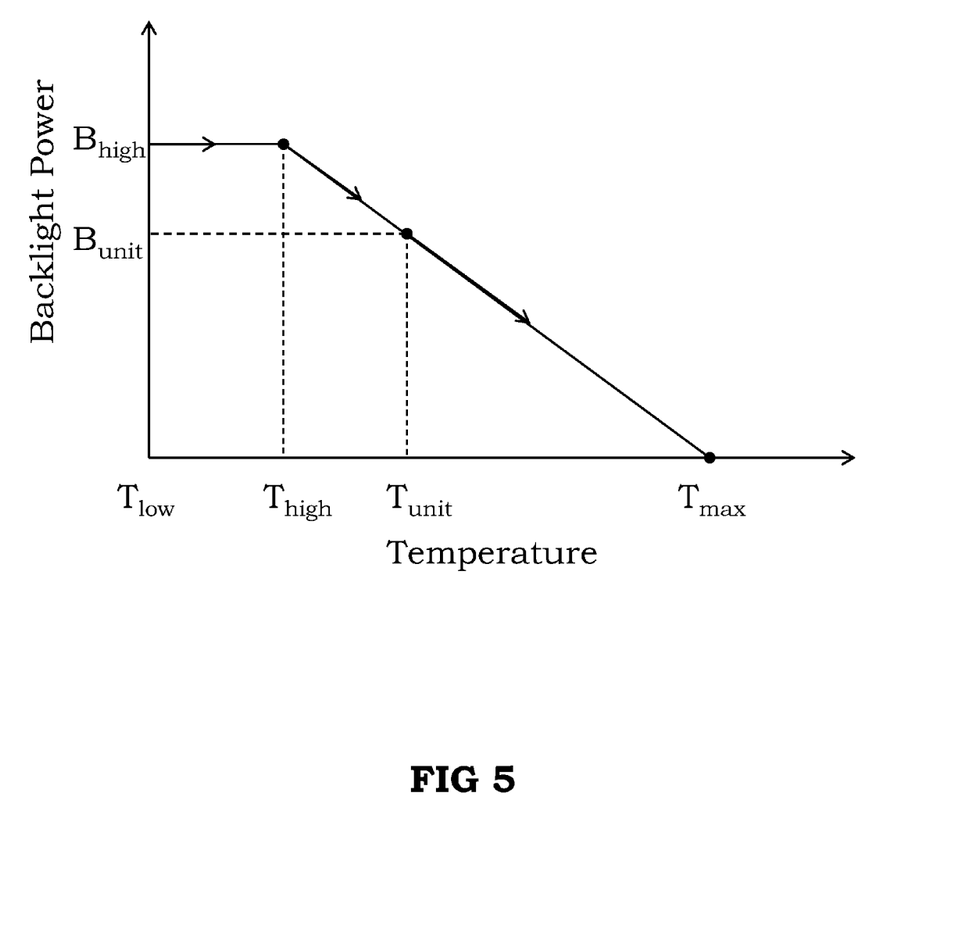
FIG. 5 is a graphical representation for one type of ramp-wise and or gradual control of the backlight based on temperature.

The term ramp-wise is used herein to describe these gradual and slight changes in power sent to the fans or backlight for the display. FIG. 5 provides a graphical representation of one type of ramp-wise and/or gradual control for the backlight. This figure shows temperature on the x axis and preferably this temperature is near the backlight cavity. The y axis shows the power which is being sent to the backlight. Before the display reaches $T_{high}$, the backlight may be powered at its highest level ($B_{high}$) (or whatever level is desirable based on the ambient light levels). However, once $T_{high}$ has been reached, the backlight may be decreased in a ramp-wise fashion to aid in cooling the display without increasing the display's current draw. If the temperature of the display continues to rise then the backlight power ($B_{unit}$) may continue to be decreased in a ramp-wise fashion. Linear interpolation may be one method for determining the proper relationship between the backlight and the temperature measurements. In the worst scenario, where the temperature of the display continues to rise even though the backlight is being reduced, when the temperature reaches the point where damage to the display is likely to result ($T_{max}$), then the backlight may finally be turned off. Ramp-wise and/or gradual control of the power to the fans may also proceed in a similar manner. For example, the power to the fans may be slightly and gradually decreased in order to avoid high current draw for the display. The purpose here may be to provide an image on the display for the longest period possible without having to completely shut down the display and/or backlight.

Figure 6:
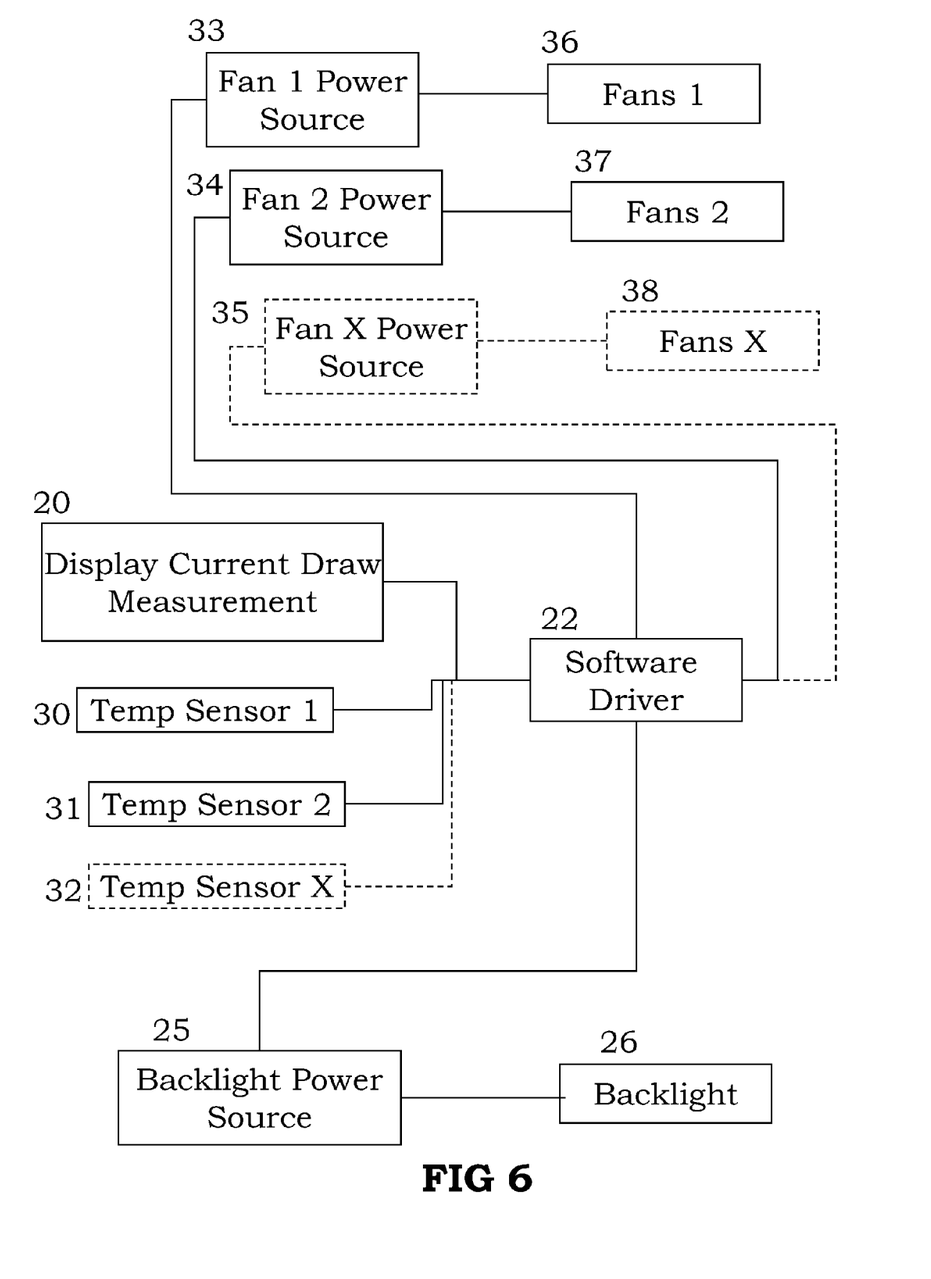
FIG. 6 is a schematic of the basic components for controlling the backlight and several cooling fans in response to several temperature measurements and current draw.

FIG. 6 shows a basic schematic for slightly more advanced embodiment which now includes at least two temperature sensors 30 and 31. A third temperature sensor X 32 is shown to indicate that the system could include as many temperature sensors as necessary. Each of the temperature sensors 30, 31, and 32 are in electrical communication with the software driver 22. In this embodiment, there are also at least two Fan power sources 33 and 34. A first set of fans 36 is connected to the first fan power source 33 while a second set of fans 37 is connected to the second fan power source 34. A third fan power source, 'Fan X Power Source' 35 is shown to indicate that there can be any number of fan power sources and associated fans 38.

Figure 7:
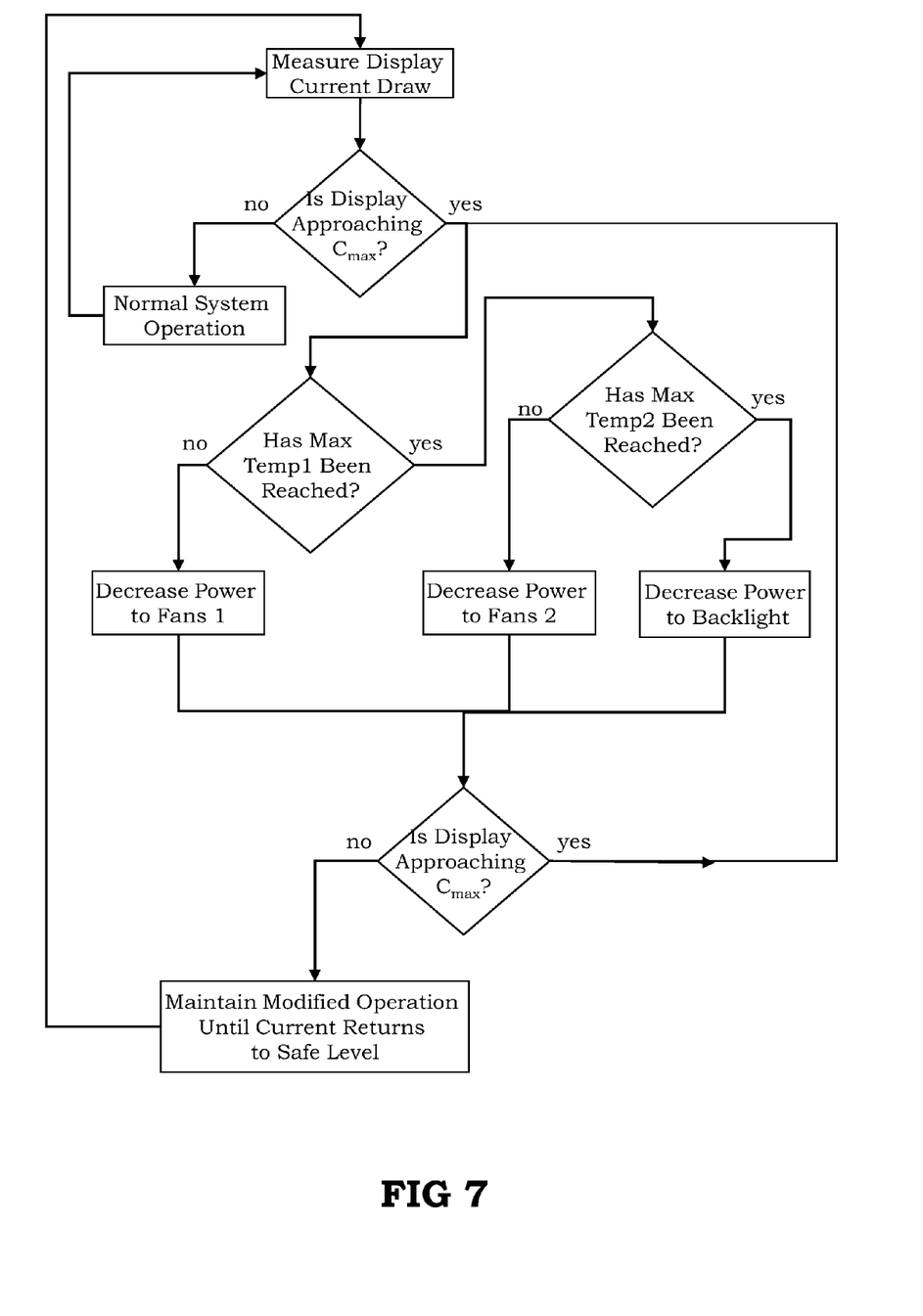
FIG. 7 is a flow chart showing the logic for controlling the backlight and several cooling fans in response to several temperature measurements and current draw.

FIG. 7 shows the logic which may be executed for an embodiment which uses two fan power sources and two sets of fans. This logic works in a similar manner as the logic disclosed in FIG. 4 with the primary exception that this logic can now balance an additional set of fans to further reduce the current draw of the system without being forced to reduce the power to the backlight unless necessary. Thus, if the display is approaching $C_{max}$ then Temp1 is checked to determine if it is near the set maximum value. If not, the power to Fans 1 may be reduced to conserve power. This decrease in power may allow the current level for the display to lower to a safe level without having to reduce the backlight. If so, the display would maintain this modified operation (lower Fan 1 powers) until a safe current level returns and the logic then restarts.

However, if the lowering of the power to the Fans 1 does not reduce the display's current draw below $C_{max}$, and the maximum temperature for Temp1 has been reached, the system may then measure Temp2 and determine if the maximum allowable temperature for Temp2 has been reached. If not, the power to Fans 2 may be reduced to conserve power. This decrease in power may allow the current level for the display to lower to a safe level without having to reduce the backlight. If so, the display would maintain this modified operation (lower Fan 1 and Fan 2 powers) until a safe current level returns and the logic then restarts. This process can be repeated for any number of additional fans and temperature sensors.

However, if the lowering of the power to the fans does not reduce the display's current draw below $C_{max}$, and the maximum temperature for Temp1 and Temp2 has been reached, the display may slightly decrease the power to the backlight in a ramp-wise fashion. Again, this should be as slight as possible so that the image is still being displayed in the brightest manner possible. These settings are maintained until the display's current has lowered to a safe level and the logic may then restart.

Figure 8:
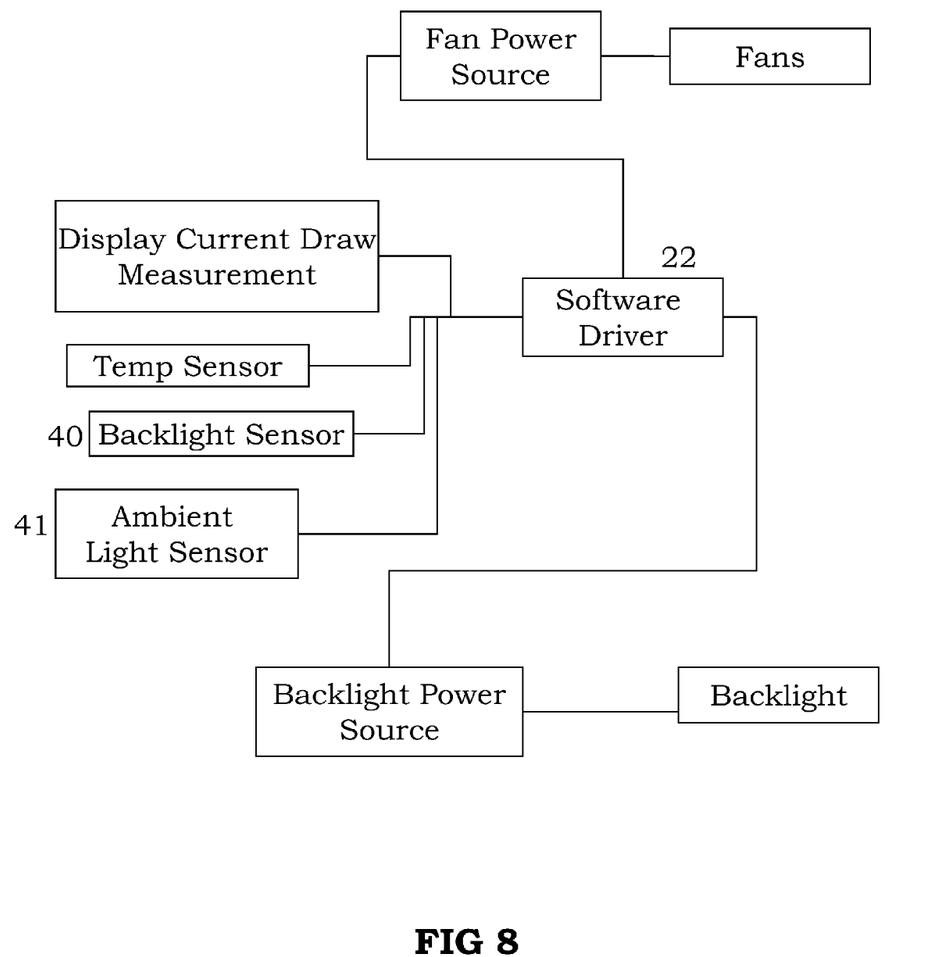
FIG. 8 is a schematic of the basic components for controlling the backlight and cooling fans in response to temperature, current draw, backlight illumination, and ambient light measurements.

FIG. 8 shows an embodiment which is similar to that shown in FIG. 3, with the main exception being the additional backlight sensor 40 and ambient light sensor 41 in electrical communication with the software driver 22. A backlight sensor 40 may be placed within the backlight cavity in order to determine the level of light coming from the backlight assembly. An ambient light sensor 41 may be placed near the front display surface to determine how much ambient light is contacting the front display surface. These additional sensors may be used in an embodiment where energy conservation is an important factor.

Figure 9:
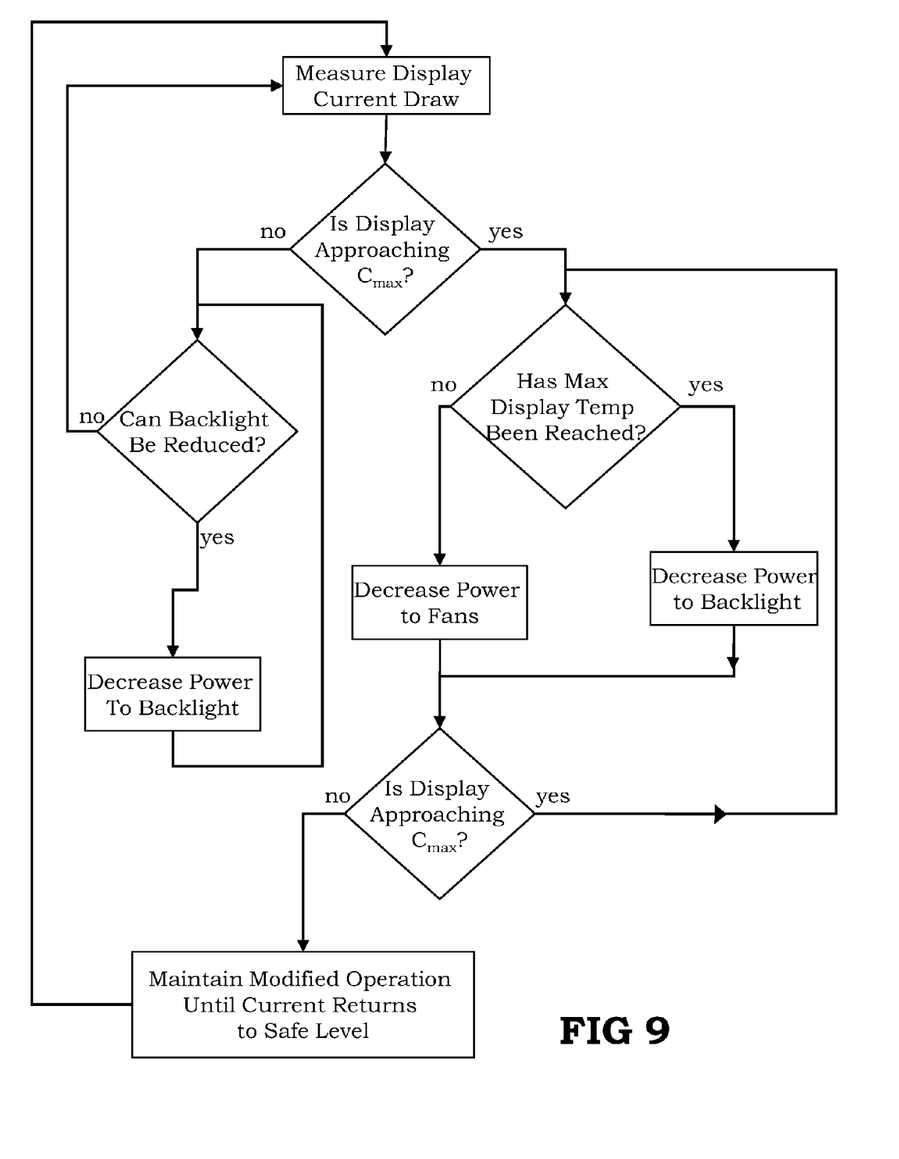
FIG. 9 is a flow chart showing the logic for controlling the backlight and cooling fans in response to temperature, current draw, backlight illumination, and ambient light measurements.

FIG. 9 shows the logic which may be performed by the software driver 22 of FIG. 7. As can be appreciated, this logic is similar to that which was shown in FIG. 4, again with the primary exception of the additional backlight logic. For an energy-conserving embodiment, $C_{max}$ may be chosen not as a value which is close to overloading the circuit, but instead may be a target for maximum energy consumption by the display. Here, although the display is being adequately controlled under $C_{max}$ based on the temperature of the display, the backlight may be reduced without allowing the image to suffer to a large degree.

Ideally, a preferred light ratio can be determined which compares the amount of light in the ambient surroundings with the amount of light being generated in the backlight cavity. For most applications, the amount of backlight will need to be greater than the amount of ambient light to ensure that the display can be seen. Preferably, the ratio of ambient light to backlight should be less than one. (ex. Ratio=ambient light/backlight). However, the precise ratio can vary depending on the particular display, environment, and application.

After a preferred light ratio is selected, it may be stored within the software driver 22. The light ratio will likely have an acceptable range, such that there is an ideal ratio with a certain amount of tolerance which allows the measured ratio to drift above or below the ideal ratio, before any action is taken by the system. The software driver 22 then reads the data from the light sensors and calculates the present light ratio. If the ratio is outside of the accepted tolerance range, then the system takes action. If the ratio is too low (i.e. there is too much backlight for the amount of ambient light), the backlight is decreased in order to preserve energy. If the ratio is too high, the backlight is increased in order to provide the necessary level of brightness. Both the decrease and increase of the backlight would preferably be completed in a ramp-wise and/or gradual fashion so that the changes would not be immediately noticeable to an observer. If the ratio is within the accepted tolerance, the current settings are maintained. While typically the maximum backlight is desired (for maximum image brightness), this added feature allows the system to maintain a minimum level of energy conservation by only using the necessary amount of backlight (especially during dusk or nighttime conditions).

It is to be understood that the spirit and scope of the disclosed embodiments are not limited to LCDs. Embodiments may be used in conjunction with any display which uses a backlight, including static advertising displays. Furthermore, embodiments of the present invention may be used with displays of other types including those not yet discovered. While the embodiments described herein are well suited for outdoor environments, they may also be appropriate for indoor applications (e.g., factory environments) where thermal stability of the display may be at risk.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

The invention claimed is:

1. A system for controlling the power consumption of an electronic display, the system comprising:
   a backlight power source in electrical communication with a display backlight;
   a fan power source in electrical communication with a fan which is positioned so as to draw cooling air through an area of the display which requires cooling;
   a temperature sensor placed in the area which requires cooling;
   a display current draw measurement device which measures the overall draw of current from the entire display; and
   a software driver receiving electrical data from the temperature sensor and display current draw measurement device and providing instructions to the backlight power source and fan power source.

2. The system of claim 1 wherein:
   the software driver receives electrical communications from the temperature sensor and display current draw measurement device in order to provide ramp-wise control of the backlight power source and fan power source.

3. The system of claim 1 further comprising:
   an ambient light sensor in electrical communication with the software driver; and
   a backlight sensor in electrical communication with the software driver.

4. The system of claim 3 wherein:
   the software driver receives electrical communications from the temperature sensor, display current draw measurement device, ambient light sensor, and backlight sensor in order to provide ramp-wise control of the backlight power source and fan power source.

5. The system of claim 1 further comprising:
   a second fan power source in electrical communication with a second fan which is positioned so as to draw cooling air through a second area of the display which requires cooling; and
   a second temperature sensor placed in the second area which requires cooling.

6. The system of claim 5 wherein:
   the software driver receives electrical communications from the temperature sensor, second temperature sensor, and display current draw measurement device in order to provide ramp-wise control of the backlight power source, fan power source, and second fan power source.

7. A method for controlling the power consumption of a system having a display backlight, a fan which is positioned so as to draw cooling air through an area of the display which requires cooling, a temperature sensor placed in the area which requires cooling, a display current draw measurement device, a maximum current value ($C_{max}$), and a maximum temperature value ($T_{max}$), the method comprising the steps of:
   measuring the display current draw with the display current draw measurement device;
   measuring the temperature of the area which requires cooling with the temperature sensor;
   decreasing the power sent to the fan if the display current draw is greater than or equal to $C_{max}$ and the temperature is less than $T_{max}$; and
   decreasing the power sent to the display backlight if the display current draw is greater than or equal to $C_{max}$ and the temperature is greater than or equal to $T_{max}$.

8. The method of claim 7 further comprising the steps of:
   re-measuring the display current draw with the display current draw measurement device;
   re-measuring the temperature of the area which requires cooling with the temperature sensor;
   further decreasing the power sent to the fan if the display current draw is greater than or equal to $C_{max}$ and the temperature is less than $T_{max}$; and
   further decreasing the power sent to the display backlight if the display current draw is greater than or equal to $C_{max}$ and the temperature is greater than or equal to $T_{max}$.

9. The method of claim 7 further comprising the steps of:
   presenting an ambient light sensor in electrical communication with the software driver;

presenting a backlight sensor in electrical communication with the software driver;
selecting a desired ratio for ambient light luminance to backlight luminance;
measuring the ambient light luminance with the ambient light sensor;
measuring the backlight luminance with the backlight sensor;
calculating the present ratio using the measurements from the ambient light and backlight sensors; and
decreasing the power to the backlight if the display current draw is less than $C_{max}$ and the present ratio is less than the desired ratio.

10. The method of claim 9 further comprising the steps of:
re-measuring the ambient light luminance with the ambient light sensor;
re-measuring the backlight luminance with the backlight sensor;
calculating a new present ratio using the re-measurements from the ambient light and backlight sensors; and
further decreasing the power to the backlight if the present ratio is still less than the desired ratio.

11. A method for controlling the power consumption of a system according to claim 1, the method comprising the steps of:
selecting a maximum current value ($C_{max}$);
selecting a maximum temperature value ($T_{max}$);
measuring the display current draw with the display current draw measurement device;
measuring the temperature of the area which requires cooling with the temperature sensor;
decreasing the power sent to the fan in a ramp-wise fashion until the current measurement is less than $C_{max}$, if the display current draw is equal to or greater than $C_{max}$ and the temperature is less than $T_{max}$.

12. The method of claim 11 further comprising the step of:
decreasing the power sent to the display backlight in a ramp-wise fashion until the current measurement is less than $C_{max}$ if the display current draw is equal to or greater than $C_{max}$ and the temperature is greater than or equal to $T_{max}$.

13. The method of claim 12 further comprising the steps of:
presenting an ambient light sensor in electrical communication with the software driver;
presenting a backlight sensor in electrical communication with the software driver;
selecting an acceptable range for the ratio of ambient light luminance to backlight luminance;
measuring the ambient light luminance with the ambient light sensor;
measuring the backlight luminance with the backlight sensor;
calculating the present ratio using the measurements from the ambient light and backlight sensors; and
decreasing the power to the backlight in a ramp-wise fashion until the present ratio is within the acceptable range, if the display current draw is less than $C_{max}$ and the present ratio is less than the acceptable range.

14. A method for controlling the power consumption of a display according to a maximum current value ($C_{max}$) and a maximum temperature value ($T_{max}$), the display having a backlight and a fan placed within an area of the display which requires cooling, the method comprising the steps of:
measuring the display current draw;
measuring the temperature of the area which requires cooling;
decreasing the power sent to the fan if the display current draw measurement is greater than or equal to $C_{max}$ and the temperature measurement is less than $T_{max}$; and
decreasing the power sent to the display backlight if the display current draw measurement is greater than or equal to $C_{max}$ and the temperature measurement is greater than or equal to $T_{max}$.

15. The method of claim 14 further comprising the steps of:
re-measuring the display current draw;
re-measuring the temperature of the area which requires cooling;
further decreasing the power sent to the fan if the display current draw measurement is greater than or equal to $C_{max}$ and the temperature measurement is less than $T_{max}$; and
further decreasing the power sent to the display backlight if the display current draw measurement is greater than or equal to $C_{max}$ and the temperature measurement is greater than or equal to $T_{max}$.

16. The method of claim 14 further comprising the steps of:
selecting a desired ratio for ambient light luminance to backlight luminance;
measuring the ambient light luminance;
measuring the backlight luminance;
calculating the present light ratio using the ambient light and backlight luminance measurements; and
decreasing the power to the backlight if the display current draw measurement is less than $C_{max}$ and the present light ratio is less than the desired ratio.

17. The method of claim 14 further comprising the steps of:
selecting an acceptable range for the ratio of ambient light luminance to backlight luminance;
measuring the ambient light luminance;
measuring the backlight luminance;
calculating the present light ratio using the ambient light and backlight luminance measurements; and
decreasing the power to the backlight in a ramp-wise fashion until the present ratio is within the acceptable range, if the display current draw measurement is less than $C_{max}$ and the present light ratio is less than the acceptable range.

* * * * *